Inventor
HUGH A. SCOTT
By Everett F. Wright
Attorney

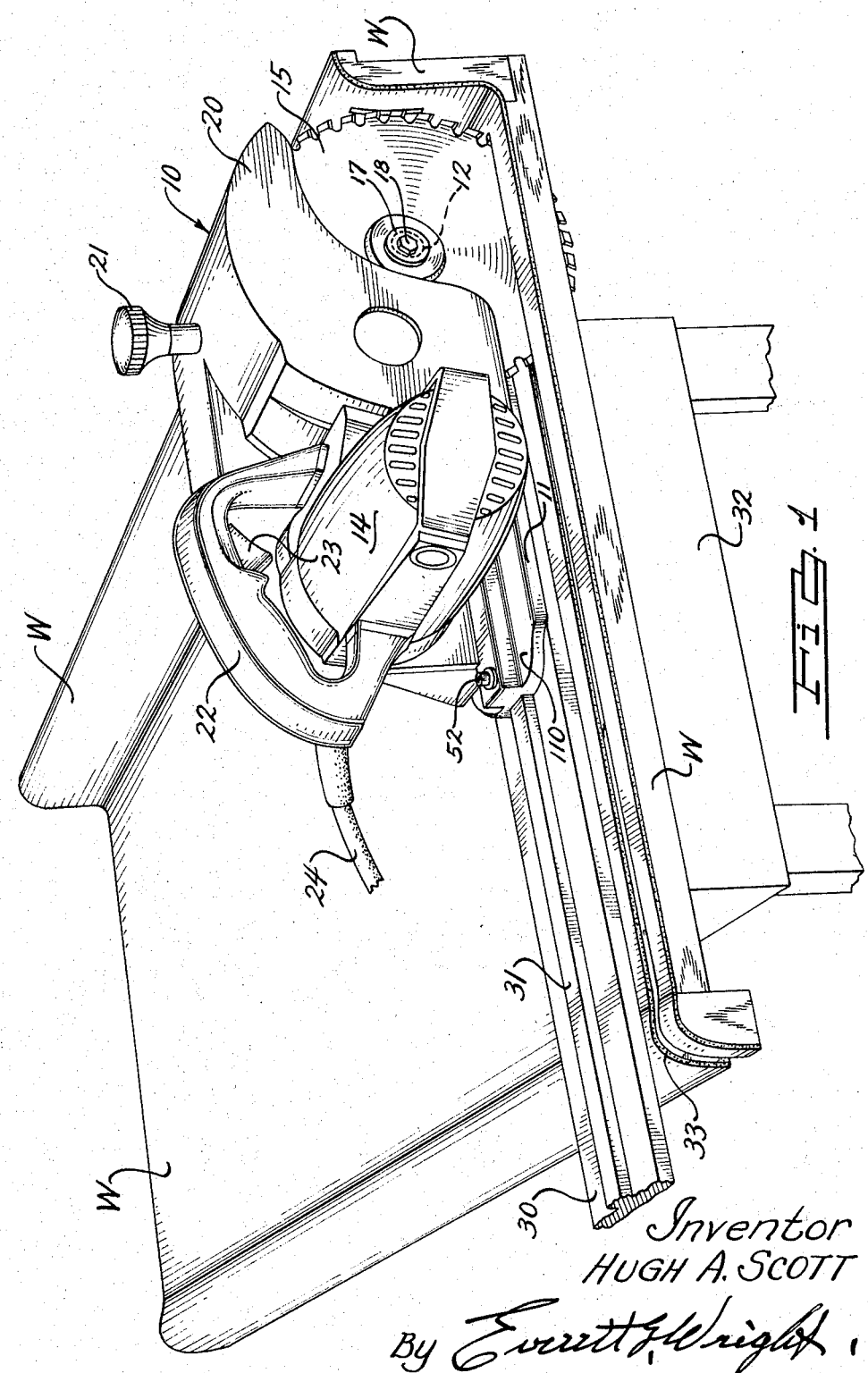

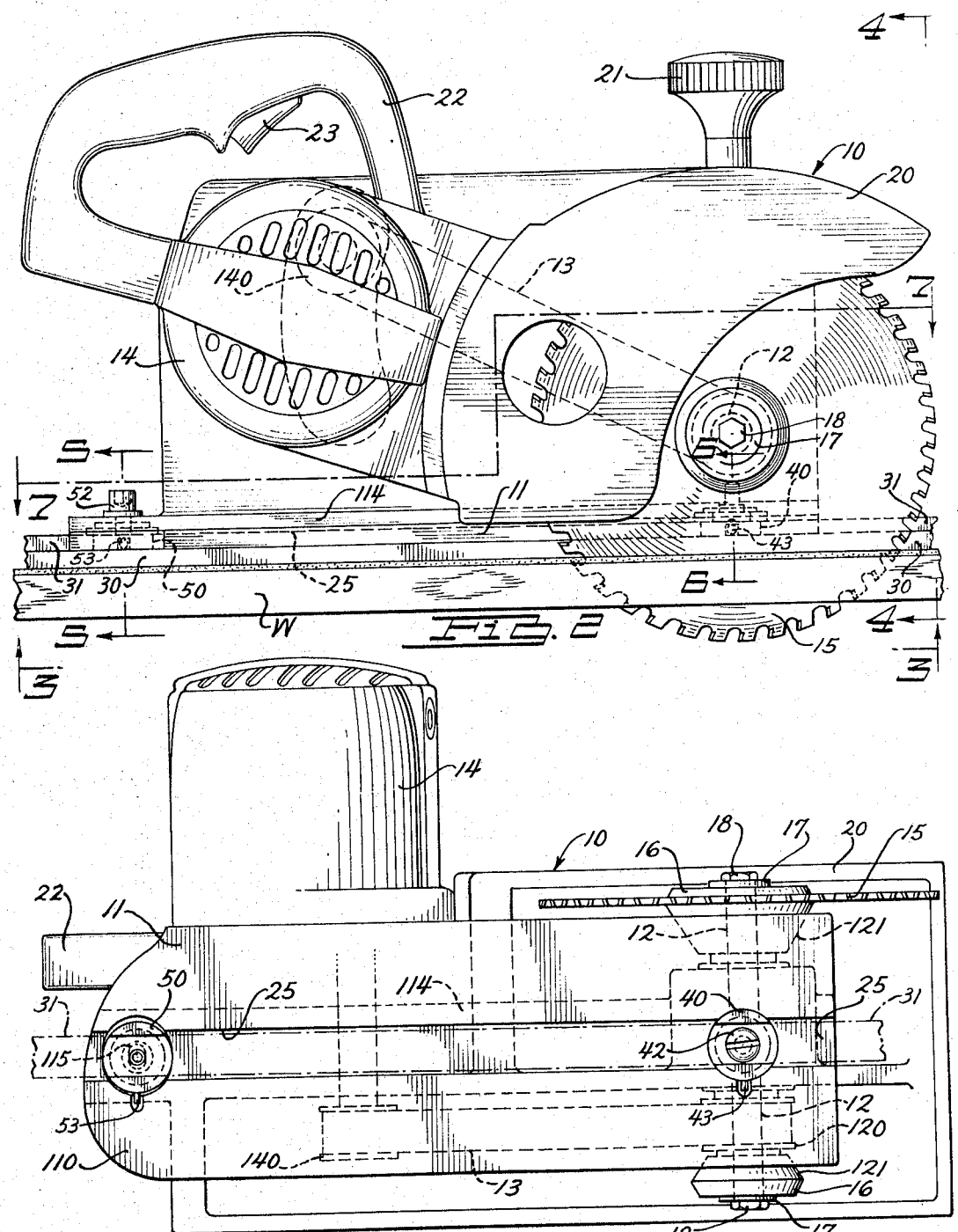

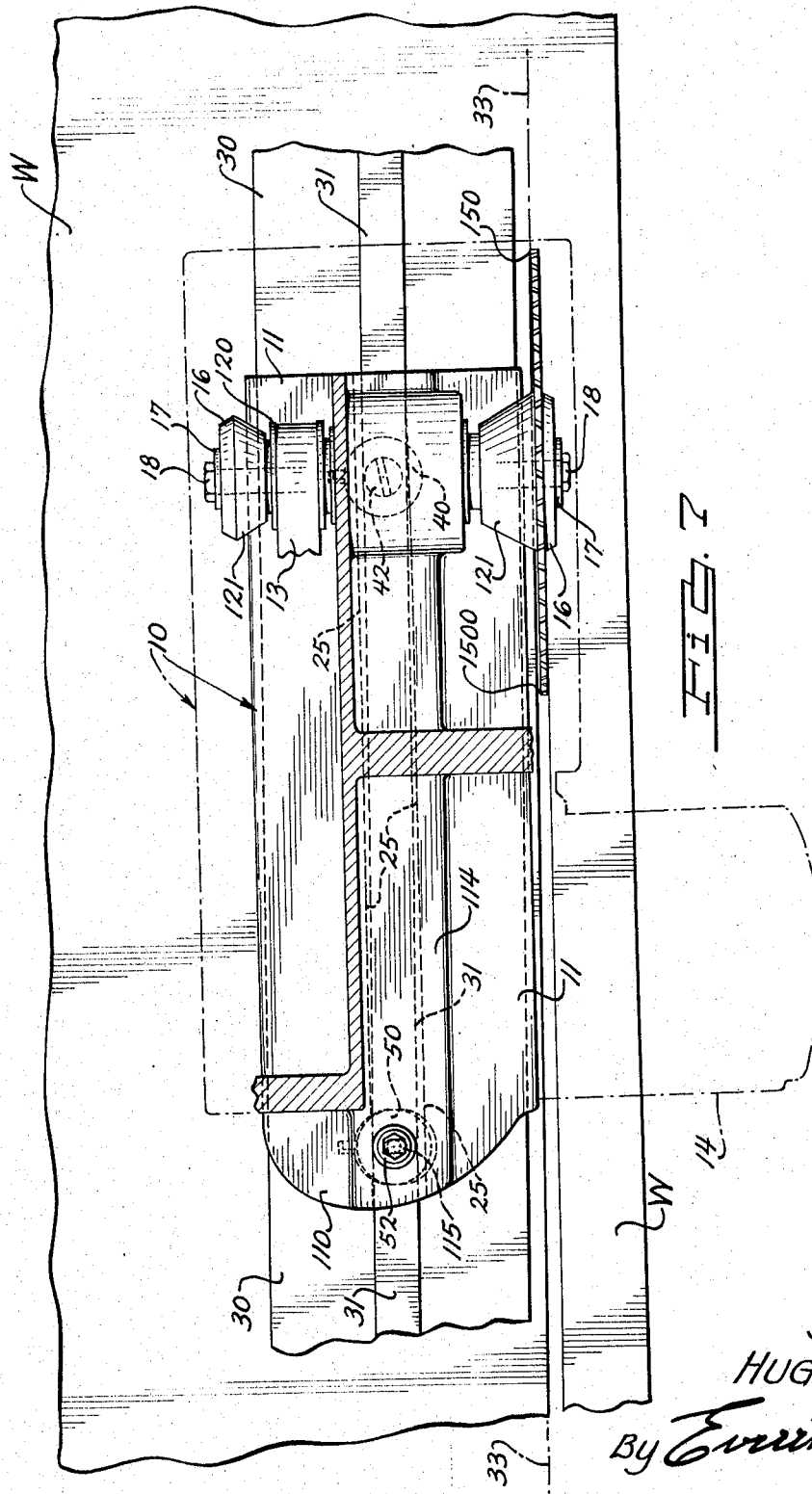

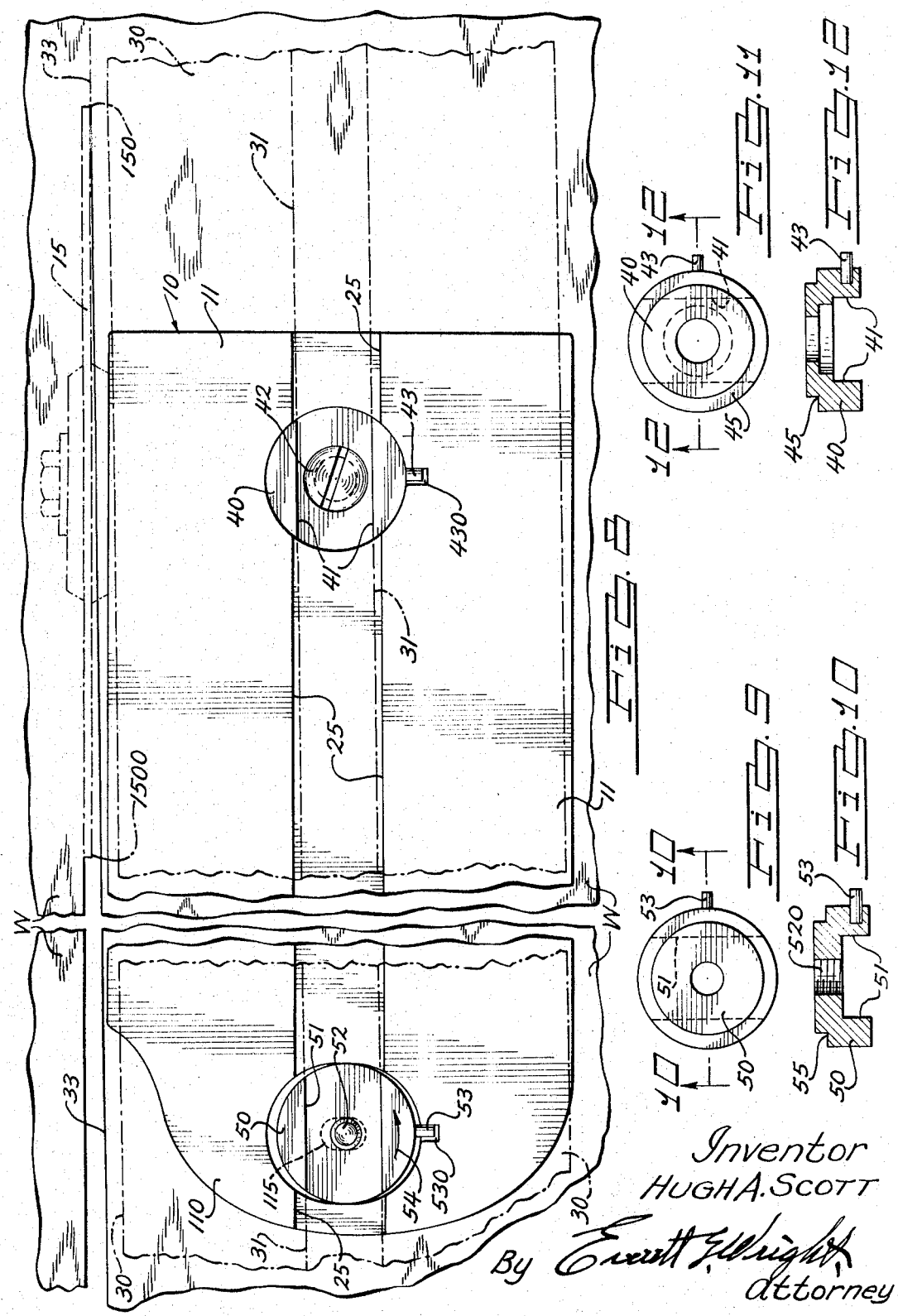

United States Patent Office 3,298,407
Patented Jan. 17, 1967

3,298,407
CLEAN CUT SAWS
Hugh A. Scott, 15472 Biltmore, Detroit, Mich. 48227
Filed July 30, 1964, Ser. No. 386,346
3 Claims. (Cl. 143—43)

This invention relates to power saws and in particular to hand power saws especially adapted to be guided across work to be cut in a manner to assure a clean saw cut on the desired line.

Much difficulty has been encountered in the sawing of brittle materials as, for example, formica covered counter top material. To accomplish accurate chip free saw cuts in formica and other hard laminated counter top material at the site of installation thereof with conventional portable equipment heretofore has been found to be substantially impossible. Therefore, most such counter top materials consisting of a base of plywood or the like to which a relatively brittle hard finished plastic, such as formica or the like has been laminated or otherwise adhered, have been pre-cut at a mill or in shops employing heavy expensive equipment. In most instances, cutting formica or other hard surfaced laminated materials at the site of erection thereof is desirable, particularly when the counter top layout embodies a relatively complicated format.

With the foregoing in view, the primary object of the instant invention is to provide a hand power saw means including guide means therefor which assures accurate clean saw cuts in formica and other laminate counter top materials and the like.

A further object of the invention is to provide a method and means for making clean chip free accurate saw cuts in hard finished veneer or other materials.

Other objects of the invention will become obvious by reference to the following detailed description taken in connection with the accompanying drawings, in which:

FIG. 1 is a view in perspective showing a clean cut saw of the invention slidably mounted on a guide rail and making a clean cut across the counter top of formica or other hard plastic sheet laminated to a wood or other relatively softer supporting base.

FIG. 2 is a somewhat enlarged side elevational view of the clean cut saw in normal cutting position on a guide rail, the guide shoes of the saw being in normal in-line position.

FIG. 3 is a bottom view of a clean cut saw of the invention with the guide shoes of the saw in their normal in-line position which would permit the saw blade to travel through the work parallel to the guide rail.

Figure 4:
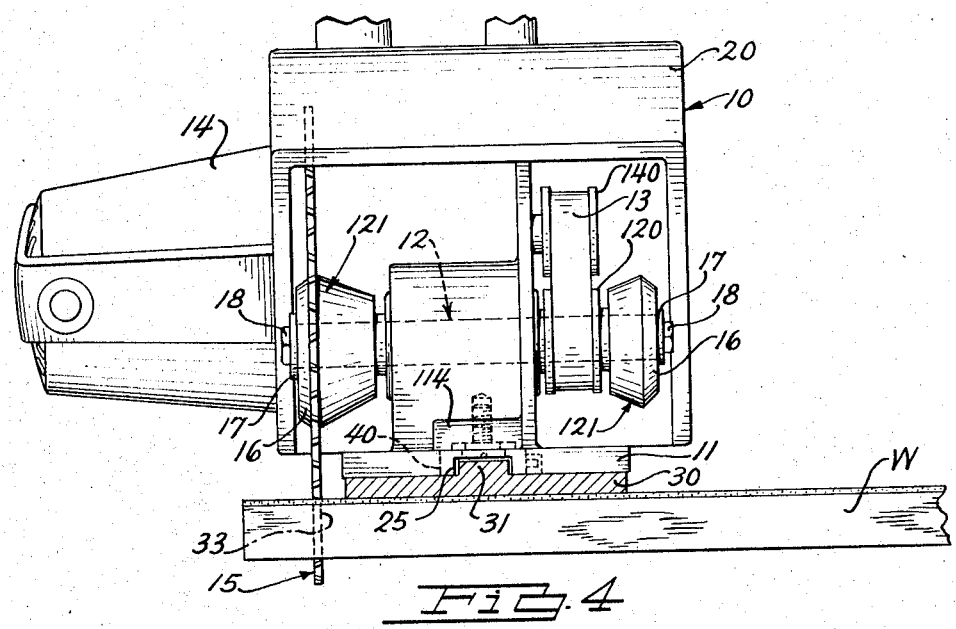
FIG. 4 is a front elevational view of the clean cut saw as shown in FIGS. 2 and 3.

FIG. 7 is a horizontal sectional view taken substantially on the line 7—7 of FIG. 2 showing the rear guide shoe shifted and turned to guide the clean cut saw along the guide rail spacing the rear portion of the saw blade from the work to eliminate blade heeling or rake to provide a chip free cut through such material as formica laminated to a wood base, the forward guide shoe having been turned slightly about its vertical axis.

FIG. 8 is an enlarged bottom plan view similar to FIG. 3 except that the rear guide shoe has been shifted and turned, and the forward guide shoe has been turned as required by the shifting and turning of the rear guide shoe causing the saw to be moved angularly along the guide rail with the saw blade passing along the line of cut in an angular relationship through the work being cut as indicated in FIGS. 1 and 7 whereby to provide an accurate chip free cut.

FIG. 9 is a top plan view of the rear shiftable and turnable guide shoe.

FIG. 10 is a cross sectional view taken on the line 10—10 of FIG. 9.

FIG. 11 is a top plan view of the front turnable guide shoe.

FIG. 12 is a cross sectional view taken on the line 12—12 of FIG. 11.

Referring now to the drawings wherein like reference numerals refer to like and corresponding parts throughout the several views, the particular embodiment of the invention disclosed for illustrative purposes comprises a hand power saw 10 having a base 11 mounting a double ended saw spindle 12 belt driven by a suitable continuous belt 13 and electric motor 14, the said belt 13 extending over the motor drive pulley 140 and the spindle driven pulley 120. A saw blade 15 preferably having carbide tipped teeth is mountable in keyed relationship on either end of the double ended saw spindle 12 against a spindle head 121 by means of a clamp disc 16, washer 17 and stud 18. The said saw blade is shown in the drawings on the right hand end of the saw spindle 12. A suitable saw guard 20 with a saw guide knob 21 thereon is provided on the front portion of the hand power saw 10. A lifting and operating handle 22 is provided at the rear portion of the saw 10 and over the motor 14. A conventional spring loaded OPEN power switch, not shown, is built into the lifting and operating handle 22 and is operated by a finger trigger 23 depending from the upper bar of the said handle 22. By manually depressing the finger trigger 23, power is applied to the saw motor 14 through a suitable power cable 24 connected to a power source, not shown.

A substantially central longitudinal guide groove 25 is formed in the bottom of the base 11 of the hand power saw 10. A guide rail 30, preferably approximately the width of the base 11 of the power saw 10, is provided to permit the said power saw to be slide longitudinally thereon. The said guide rail 30 is provided with a preferably central rail head 31 of such a height and width as to dovetail freely into the longitudinal guide groove 25 in the base 11 of the power saw 10 when the said power saw 10 is placed on the guide rail 30.

The guide rail 30 is removably secured to work W to be cut by suitable clamp or other means which is not shown inasmuch as a number of different types of guide rail securement means may be employed which are not considered to be a part of the instant invention. During cutting the work W is supported on a suitable bench or the like 32.

The clearance between the guide rail head 31 of the guide rail 30 and the walls of the longitudinal guide groove 25 in the bottom of the base 11 of the power saw 10 is such as will enable the power saw 10 to be swung out of alignment with the said guide rail head 31 so that the rear end 110 of the base 11 of the power saw 10 may be swung from a central position in respect to the guide rail 30 and the said rail head 31 as shown in FIG. 3 to the right as shown in FIG. 7. This swings the inner trailing edge 1500 of the rotating saw blade 15 laterally outwardly from the line of cut 33 while the inner leading edge 150 of the saw blade 15 remains on the line of cut 33. This "heeling out" of the trailing edge 1500 of the rotating saw blade 15 assures a clean chip free cut of formica or other hard surfaced laminated material such as employed in counter top or cabinet top construction.

As best shown in FIG. 3, the said forward and rear guide shoes 40 and 50 are disposed on the lonigtudinal center of central longitudinal guide groove 25 in the base 11 of the hand power saw 10. To establish and maintain the movement of the hand power saw 10 at the desired angular relationship along the guide rail 30, a forward circular vertically pivoted guide shoe 40 and a rearward circular vertically pivoted laterally shiftable guide shoe 50 are employed, see FIGS. 7 and 8. The said guide shoes 40 and 50 each have a central channel 41 and 51 respectively therein permitting them to fit neatly over the guide rail head 31 of the guide rail 30. Thusly, according to the distance to which the rear guide shoe 50 is shifted laterally either way off-center of the central longitudinal guide groove 25 of the base 11 of the saw 10, the said front shoe guide 40 automatically pivots, and, at the same time, the rear guide shoe 50 pivots to align itself with the front guide shoe 40. Therefore, when the saw 10 is on the guide rail 30, in any particular laterally shifted position of the rear guide shoe 50, the central channels 41 and 51 of the guide shoes 40 and 50 are in alignment.

The bottom of the said guide shoes 40 and 50 preferably are located slightly above the bottom of the base 11 of the said hand power saw 10 to avoid unnecessary friction therebetween.

Figure 6:
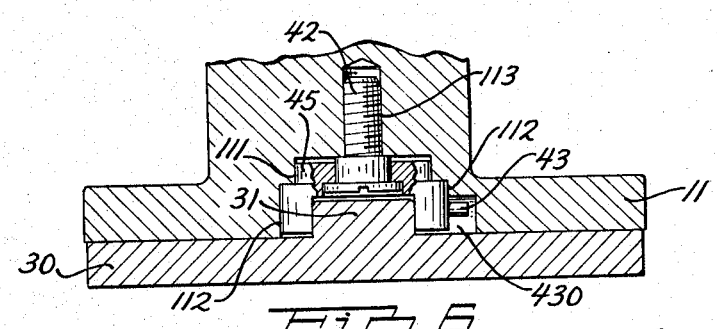
FIG. 6 is an enlarged cross sectional view of the saw base taken on the line 6—6 of FIG. 2 showing the front turnable guide shoe on the guide rail with said guide shoe disposed in a normal in-line position.

The circular front guide shoe 40 is mounted to turn freely on a shouldered stud 42 as best shown in FIG. 6. The turnability of the said front guide shoe 40 is limited by a turn limit pin 43 extending radially outwardly from the base thereof into a narrow radially disposed turn limit groove 430 cut in the bottom of the base 11 of the power saw 10 communicating with the counterbore 112 of a bore 111. The said bore 111 and counterbore 112 are aligned with a threaded bore 113 provided in the base 11 to accommodate the said front guide shoe 40 with its vertical axis laterally central with respect to the central guide groove 25 in the said base 11. The said front guide shoe 40 has the upper portion thereof stepped at 45 to turnably fit within the said bore 111 and counterbore 112 in the base 11. It will be noted that the front guide shoe 40 is preferably located substantially below the axis of rotation of the saw spindle 12 and the guide knob 21 of the hand power saw 10.

The circualr rear guide shoe 50 is located near the rear end 1100 of the base 11 of the power saw 10 and is mounted for limited turning in respect to a headed anchor stud 52 extending through a laterally disposed slotted aperture 115 through the central longitudinal rib 114 formed along the top of the base 11 of the saw 10 over central guide groove 25 thereof. A laterally elongated stepped recess 116 and 117 in the base 11 accommodates the rear guide shoe 50. The said elongated stepped recess 116 and 117 is slightly larger than the guide shoe 50 in its front to back dimension, and considerably larger than the guide shoe 50 in its lateral dimension to permit the said rear guide shoe 50 to be shifted laterally; for example, to the right as viewed in FIG. 8. At the same time, the said guide shoe 50 is turned in the direction of the arrow 54 in FIG. 8 so that the central channel 51 therein is on a suitable angle in respect to the central longitudinal guide groove 25 in the base 11 of the hand power saw 10. The said guide shoe 50 has the upper portion thereon stepped at 55 to turnably and slidably fit within the stepped recess 116 and 117 in the base 11.

Figure 5:
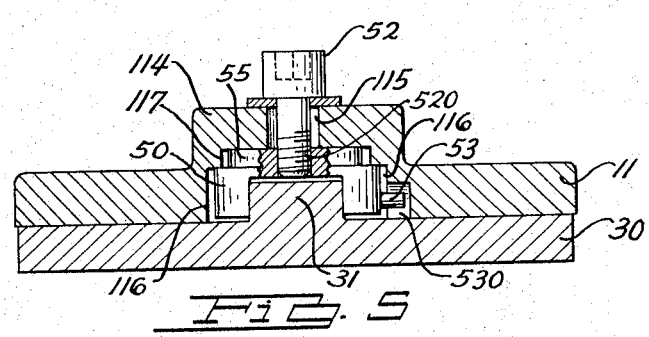
FIG. 5 is an enlarged cross sectional view of the saw base taken on the line 5—5 of FIG. 2 showing the rear laterally shiftable and turnable guide shoe on the guide rail with the said rear guide shoe disposed in a normal in-line position.

The said guide shoe 50 is provided with a stop pin 53 extending radially therefrom into a narrow radially disposed turn limit groove 530 cut in the bottom of the base 11 as best shown in FIGS. 5 and 8 communicating with the step 116 of the stepped recess 116–117 therein. By tightening the headed anchor stud 52 threaded centrally into the top of the guide shoe 50 at the central threaded aperture 520 therein, the said guide shoe 50 is anchored in the desired angular offset position with respect to the central longitudinal guide groove 25 in the base 11 of the hand power saw 10.

The said power saw 10 when pushed along the guide rail 30 with the guide shoes 40 and 50 travels along the guide rail head 31 causes the saw blade 15 thereof to cut through the work W with the leading edge 150 of the saw blade 15 moving along the line of cut 33 while the trailing edge 1500 of the said saw blade 15 is heeled laterally outwardly and disposed in substantial spaced relationship to the said line of cut 33. This provides a clean chip free cut through work W such as, for example, through a hard surface material work such as formica 70 laminated to a supporting element 71. Of course, hand power saws of the invention make extremely accurate chip free cuts in many other materials difficult to cut without chipping or splintering.

Although but a single embodiment of the invention has been disclosed herein, it is obvious that many changes may be made in the size, shape, arrangement and details of the various elements of the invention without departing from the spirit and scope of the invention as defined by the appended claims.

I claim:

1. Means for producing substantially chip free saw cuts through readily chipped work pieces such as brittle surfaced laminated counter top material or the like comprising, in combination with a rail including a central longitudinally disposed rail head thereon, a power saw including a flat generally rectangular base with the saw blade thereof disposed parallel to and extending partially below said base, said base having a central longitudinal guide groove therein disposed over said guide rail head, said guide groove being slightly deeper and somewhat wider than said guide rail head, a pair of longitudinally spaced guide shoes in the bottom of said saw base disposesd centrally of said guide groove therein and formed to fit neatly over and slide along said guide rail head, means mounting said forward guide shoe permitting limited turning thereof about an axis normal to said base, means mounting said rear guide shoe permitting limited turning thereof about an axis normal to said base and limited lateral shifting thereof in respect to the said guide groove in said base, and said means mounting said rear guide shoe including means securing the same in any selected position to which it may be turned and shifted.

2. Means for producing susbtantially chip free saw cuts through readily chipped work pieces such as brittle surfaced laminated counter top material or the like comprising a clean cut power saw movable along a guide rail having a guide rail head extending along the upper surface thereof, said clean cut saw comprising a flat generally rectangular base, a transverse spindle mounted on said base including a saw mounted on said spindle spaced laterally outwardly from said base disposed parallel thereto and extending partially therebelow, power means driving said spindle and said saw thereon for sawing a work piece, a housing over said base, spindle, saw and power means including means engageable for manually pushing said saw along said guide rail, said base having a central longitudinal guide groove therein disposed over said guide rail head, said guide groove being deeper and wider than said guide rail head, a pair of longitudinaly spaced guide shoes in the bottom of said saw base disposed centrally of said guide groove therein and formed to fit neatly over and slide along said guide rail head, the forward guide shoe being located substantially below the axis of rotation of said saw spindle and the rearward guide shoe being located substantially at the rear of said base, means mounting said forward guide shoe for limited turning about an axis normal to said base, means mounting rear guide shoe permitting limited turning thereof about an axis normal to said base and limited lateral shifting thereof in respect to the said guide groove in said base, and said means mounting said rear guide shoe including means securing the same in any selected position to which it may be turned and shifted.

3. Means for producing substantially chip free saw cuts through readily chipped work pieces comprising, in combination with a guide rail disposable along and parallel to a line of cut to be made by a saw including a central longitudinally disposed rail head thereon, a hand power saw including a flat generally rectangular base with the saw blade thereof disposed parallel to and extending partially below said base, said base having a central longitudinal guide groove therein disposable over said guide rail head, said guide groove being slightly deeper and somewhat wider than said guide rail head, a pair of longitudinally spaced guide shoes in the bottom of said saw base disposed centrally of said guide groove therein and formed to fit in close slidable relationship over and slide along said guide rail head, means mounting said forward guide shoe laterally central of said guide groove permitting limited turning thereof about an axis normal to said base, means mounting said rear guide shoe laterally central of said guide groove permitting limited turning thereof about an axis normal to said base and limited lateral shifting thereof in respect to said guide groove, and means fixing said rear guide shoe in a selected position to which it may be turned and shifted whereby to cause said power saw when pushed along said base with said guide shoes in slidable engagement with said guide rail head to track in an angular relationship with respect to the line of cut in work disposed under said guide rail.

References Cited by the Examiner

UNITED STATES PATENTS

| | | | |
|---|---|---|---|
| 2,014,229 | 9/1935 | Emmons | 143—47 X |
| 2,986,178 | 5/1961 | Cranmore | 143—43 X |
| 3,186,452 | 6/1965 | Magnussen | 143—6 X |

WILLIAM W. DYER, JR., *Primary Examiner.*

W. D. BRAY, *Examiner.*